United States Patent
Chang et al.

(10) Patent No.: US 7,377,682 B2
(45) Date of Patent: May 27, 2008

(54) BACKLIGHT MODULE AND LIQUID CRYSTAL DISPLAY DEVICE USING THE SAME

(75) Inventors: Chih Ching Chang, Miao-Li (TW); Yen-Chang Yao, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 107 days.

(21) Appl. No.: 11/288,558

(22) Filed: Nov. 28, 2005

(65) Prior Publication Data

US 2006/0114689 A1   Jun. 1, 2006

(30) Foreign Application Priority Data

Nov. 26, 2004   (TW) ............................... 93219059 U

(51) Int. Cl.
*F21V 7/04*   (2006.01)

(52) U.S. Cl. ....................... 362/633; 362/631; 362/561; 349/58

(58) Field of Classification Search ................ 362/561, 362/612, 632–634, 602, 631, 29, 30, 223, 362/225, 607, 630; 349/58, 60
See application file for complete search history.

(56) References Cited

U.S. PATENT DOCUMENTS

| | | | |
|---|---|---|---|
| 6,222,689 B1 | 4/2001 | Higuchi et al. | |
| 6,507,377 B1 * | 1/2003 | Jung | ............................ 349/60 |
| 6,992,736 B2 * | 1/2006 | Saito et al. | .................... 349/58 |
| 7,121,692 B2 * | 10/2006 | Yu et al. | ..................... 362/561 |
| 2005/0141244 A1 * | 6/2005 | Hamada et al. | ............. 362/612 |

* cited by examiner

*Primary Examiner*—Bao Q Truong
(74) *Attorney, Agent, or Firm*—Wei Te Chung

(57) ABSTRACT

A backlight module includes a frame (55) including a spring element (556), a light guide plate (56) disposed in the frame including an incident surface (561), and a radiation element (59) being pressed onto the incident surface by the spring element. The spring element presses the radiation elements against the light guide plate, and thereby decreases the distance and angle between the radiation elements and the light guide plate. This improves the brightness and uniformity of the emitting luminance of the backlight module.

2 Claims, 4 Drawing Sheets

BACKLIGHT MODULE AND LIQUID CRYSTAL DISPLAY DEVICE USING THE SAME

FIELD OF THE INVENTION

The present invention relates to a backlight module and a liquid crystal display (LCD) device using the same, and more particularly to a backlight module with spring arms.

GENERAL BACKGROUND

Conventionally, an LCD device includes a backlight module, a liquid crystal panel, and a frame for accommodating the backlight module and the liquid crystal panel.

FIG. 6 shows a schematic, top view of a conventional LCD 300. The LCD 300 includes a flexible printed circuit (FPC) board 310, a liquid crystal display panel 320, a rubber frame 330, two light emitting diodes (LEDs) 340 cooperatively serving as a light source, and a light guide plate 400. The FPC 310 connects with the liquid crystal display panel 320, and includes a main circuit area 311 and a light source setting area 312. The light source setting area 312 is an appending portion extending from the main circuit area 311. The LEDs 340 are arranged on the light source setting area 312. The frame 330 includes a depressed portion 331, and the depressed portion 331 has two openings 332.

The LCD 300 can be assembled according to the following sequence: firstly, setting the light guide plate 400 inside the frame 330; secondly, arranging the light source setting area 312 into the depressed portion 331, and placing the LEDs 340 into the openings 332; thirdly, folding the main circuit area 311 to the frame 330 and the light guide plate 400; and lastly, folding the liquid crystal display panel 320 to the frame 330.

However, the above-mentioned conventional liquid crystal display has the following problems.

The sizes of the openings 332 may not precisely match the sizes of the LEDs 340 due to imprecise manufacturing. When this happens, small gaps exist between the LEDs 340 and the light guide plate 400 after assembly. These gaps may diminish the emitting luminance of the light guide plate 400. In addition, the FPC 310 easily bends, thereby changing angles between the LEDs 340 and the light guide plate 400. This can reduce the uniformity of the emitting luminance.

FIG. 7 is a graph showing the negative impact of the above mentioned gaps on the effective utilization of the emitting luminance. X represents the distance between the LEDs 340 and the incident surface (not labeled) of the light guide plate 400 in millimeters (mm), and Y represents the relative emitting luminance of the light guide plate 400 as a function of X. It can be seen that the greater the value of X, the lower the value of Y. That is, the greater the gap, the lower the value of the relative emitting luminance.

What is needed, therefore, is a backlight module and a liquid crystal display device using the same that overcome the above-described deficiencies.

SUMMARY

In a preferred embodiment, a backlight module includes a frame including spring arms, a light guide plate disposed in the frame and including an incident surface, and radiation elements pressed against the incident surface by corresponding spring arms.

A liquid crystal display device includes a liquid crystal display panel, and the backlight module as described above.

The spring element presses the radiation elements against the light guide plate, and thereby decreases the distance and angle between the radiation elements and the light guide plate. This improves the brightness and uniformity of the emitting luminance of the backlight module.

Other advantages and novel features will become more apparent from the following detailed description when taken in conjunction with the accompanying drawings.

DETAILED DESCRIPTION OF PREFERRED EMBODIMENTS

Figure 1:
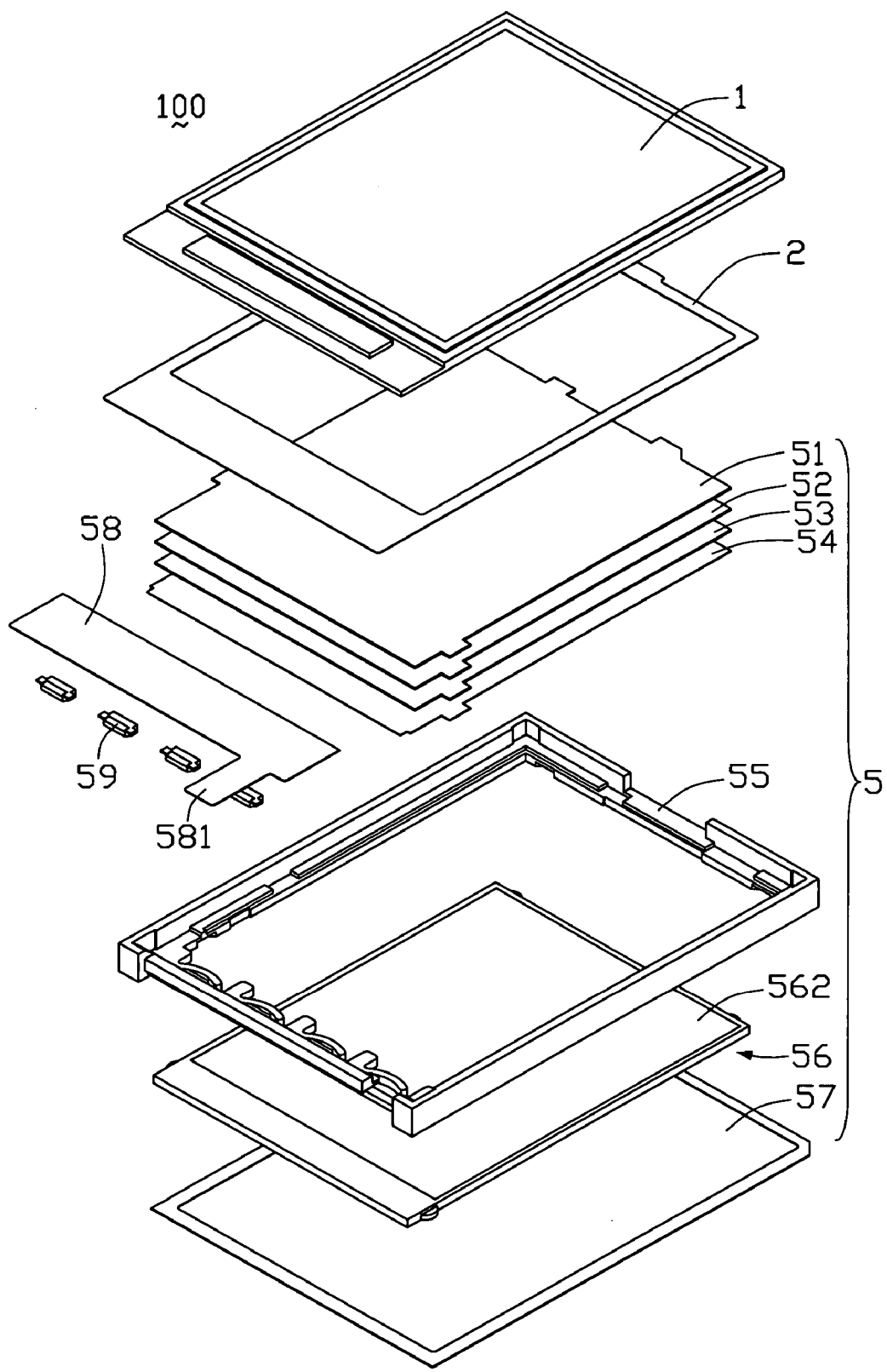
FIG. 1 is an exploded, isometric view of an LCD device according to a preferred embodiment of the present invention, the LCD device comprising a frame, a light guide plate, and LEDs.

FIG. 1 is an exploded, isometric view of an LCD device according to a preferred embodiment of the present invention. The LCD device 100 includes a liquid crystal display panel 1, a light cover plate 2, and a backlight module 5.

The backlight module 5 includes a first diffusion plate 51, a first brightness enhancement film 52, a second brightness enhancement film 53, a second diffusion plate 54, a frame 55, a light guide plate 56, a reflective plate 57, and a printed circuit board 58.

Figure 2:
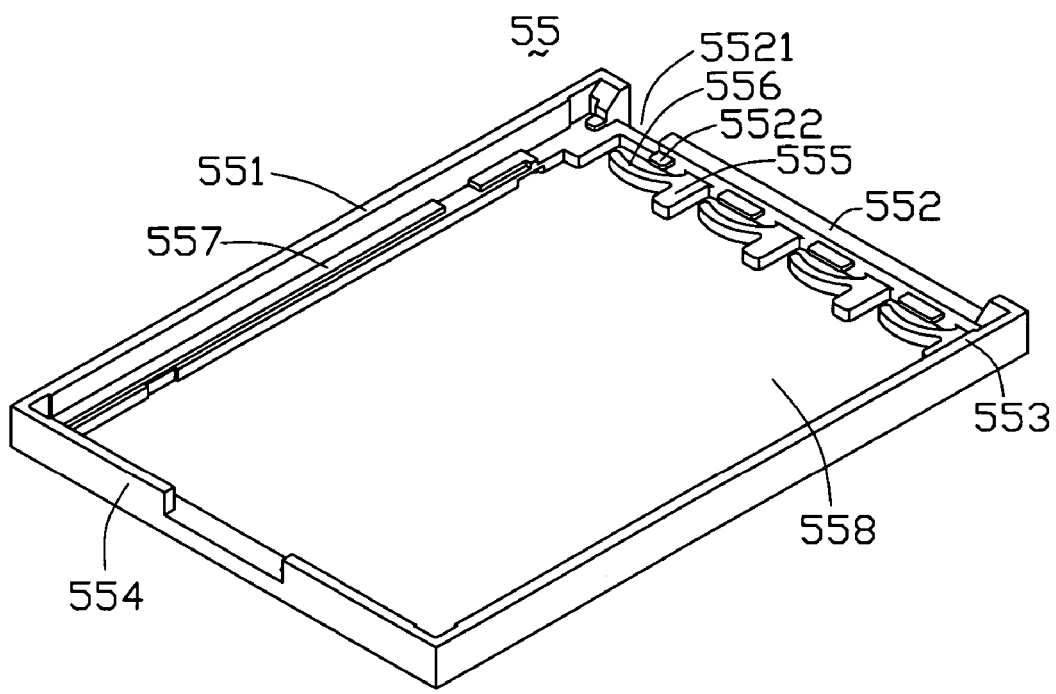
FIG. 2 is an isometric view of the frame of FIG. 1, but viewed from another aspect.
Figure 3:
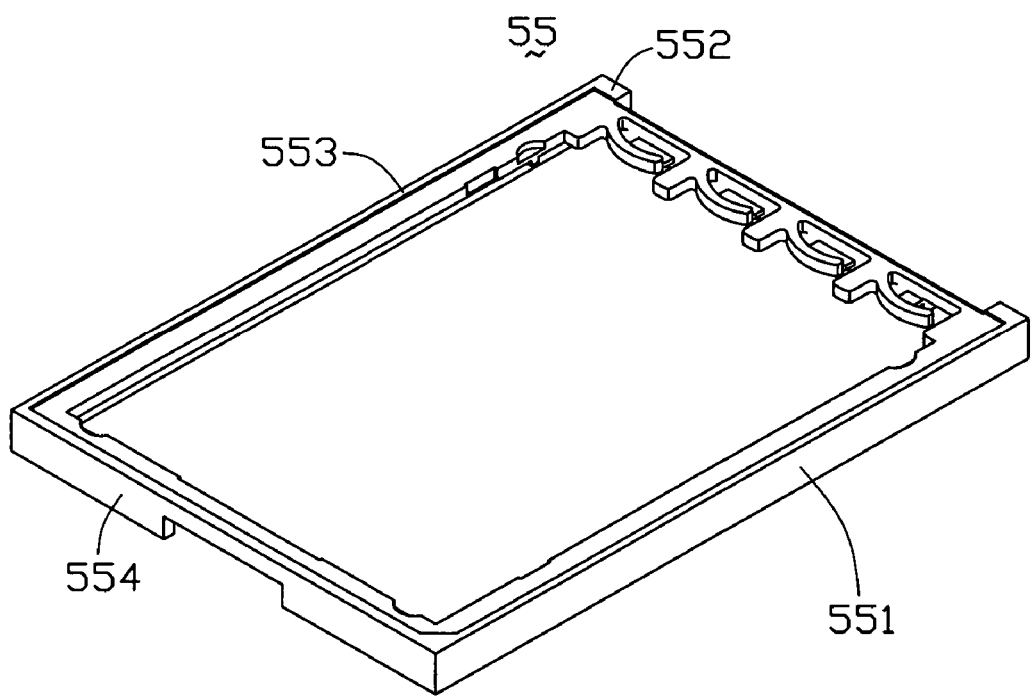
FIG. 3 is an inverted view of the frame of FIG. 2.

As shown in FIG. 2 and FIG. 3, the frame 55 is preferably made of rubber. The frame 55 includes a first side wall 551, a second side wall 552, a third side wall 553, a fourth side wall 554, and a supporting bar 557. The first side wall 551, the second side wall 552, the third side wall 553, and the fourth side wall 554 cooperatively define a space 558 therebetween. The bar 557 is substantially U-shaped, and adjoins inside surfaces of the first, fourth and third side walls 551, 554, 553 inside the space 558.

The second side wall 552 defines a gap 5521 at one end thereof, and has a plurality of protrusions 5522 formed along an inside surface thereof. A plurality of partitions 555 extend from the inside surface of the second side wall 552 into the space 558. A spring arm 556 extends from a same lateral side of each of the partitions 555. The partitions 555 are generally rectilinear. The spring arms 556 are curved, and are oriented generally perpendicular to the corresponding partitions 555. In the illustrated embodiment, the spring arms 556 are arc-shaped. The protrusions 5522 are located at an elevation above that of the partitions 555, so as to form an interspace between the partitions 555 and the protrusions 5522.

Figure 4:
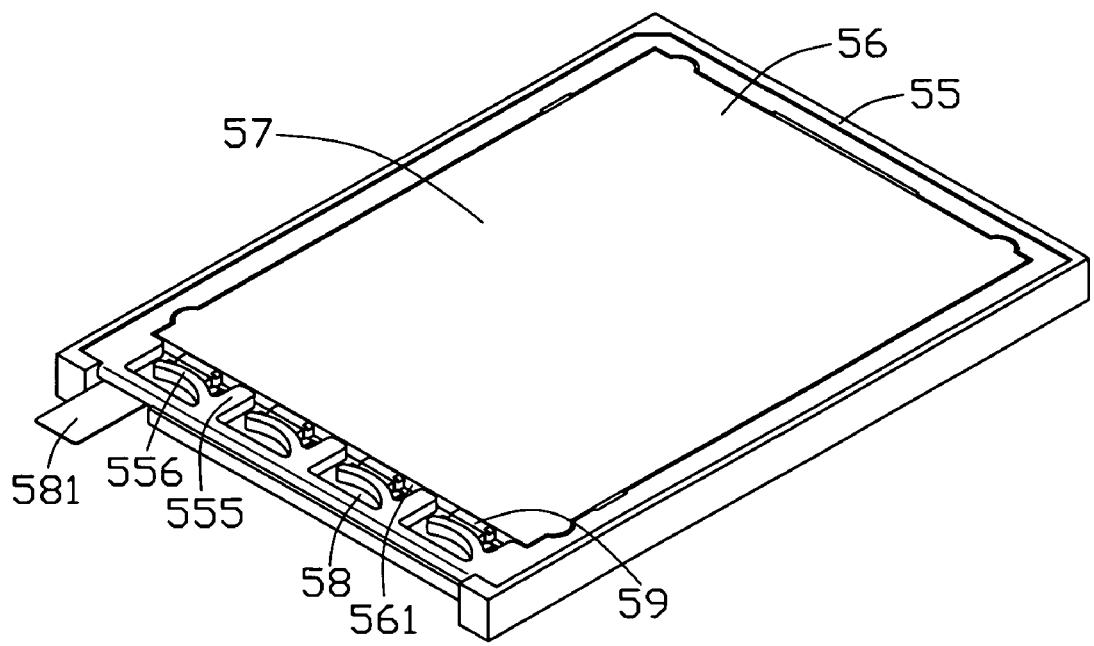
FIG. 4 is an inverted, isometric view of the frame, the LED, and the light guide plate of FIG. 1 assembled together.

As shown in FIG. 4, the printed circuit board 58 includes a plurality of radiation elements 59 and a connection strip 581. The radiation elements 59 are typically light emitting diodes (LEDs).

In assembly, the light guide plate 56 is received in the space 558, and one side portion of the printed circuit board 58 is received in the interspace between the partitions 555 and the protrusions 5522. The spring arms 556 are elastically bent away from the light guide plate 56 to allow insertion of the radiation elements 59 between the spring arms 556 and the light guide plate 56. Upon release of the spring arms 556, they recoil to press the corresponding radiation elements 59 against the incident surface 561 of the light guide plate 56. The connection strip 581 extends out from the frame 55 through the gap 5521. The reflective plate 57 is placed on top of the light guide plate 56.

Figure 5:
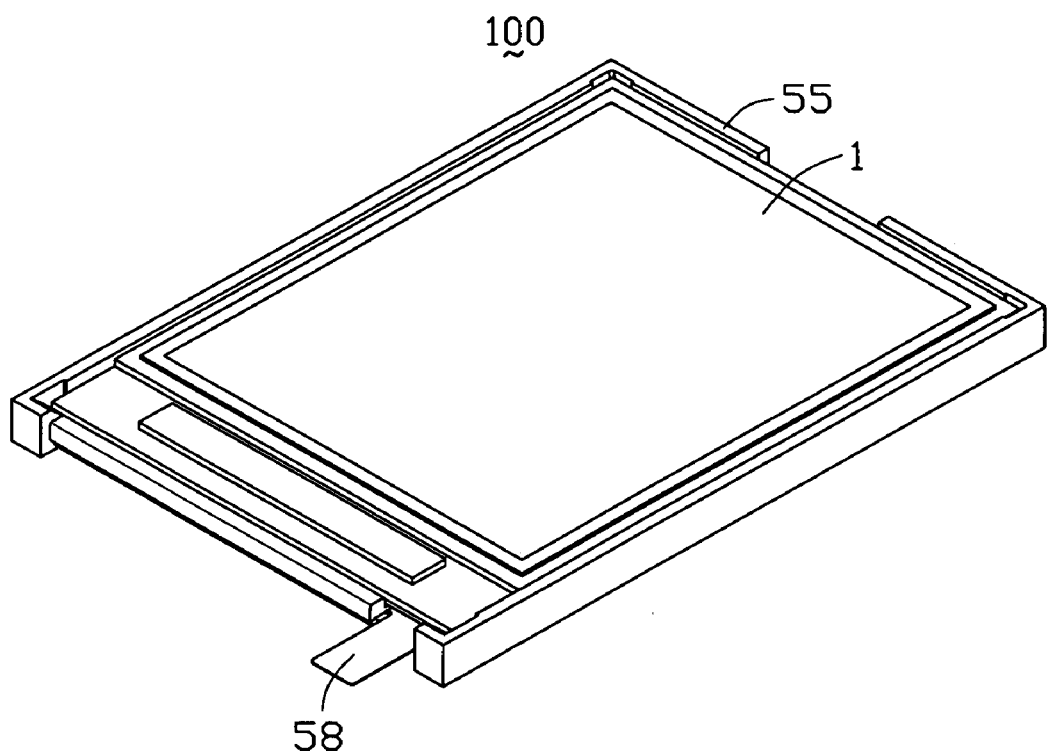
FIG. 5 is an assembled view of the LCD of FIG. 1.
Figure 6:
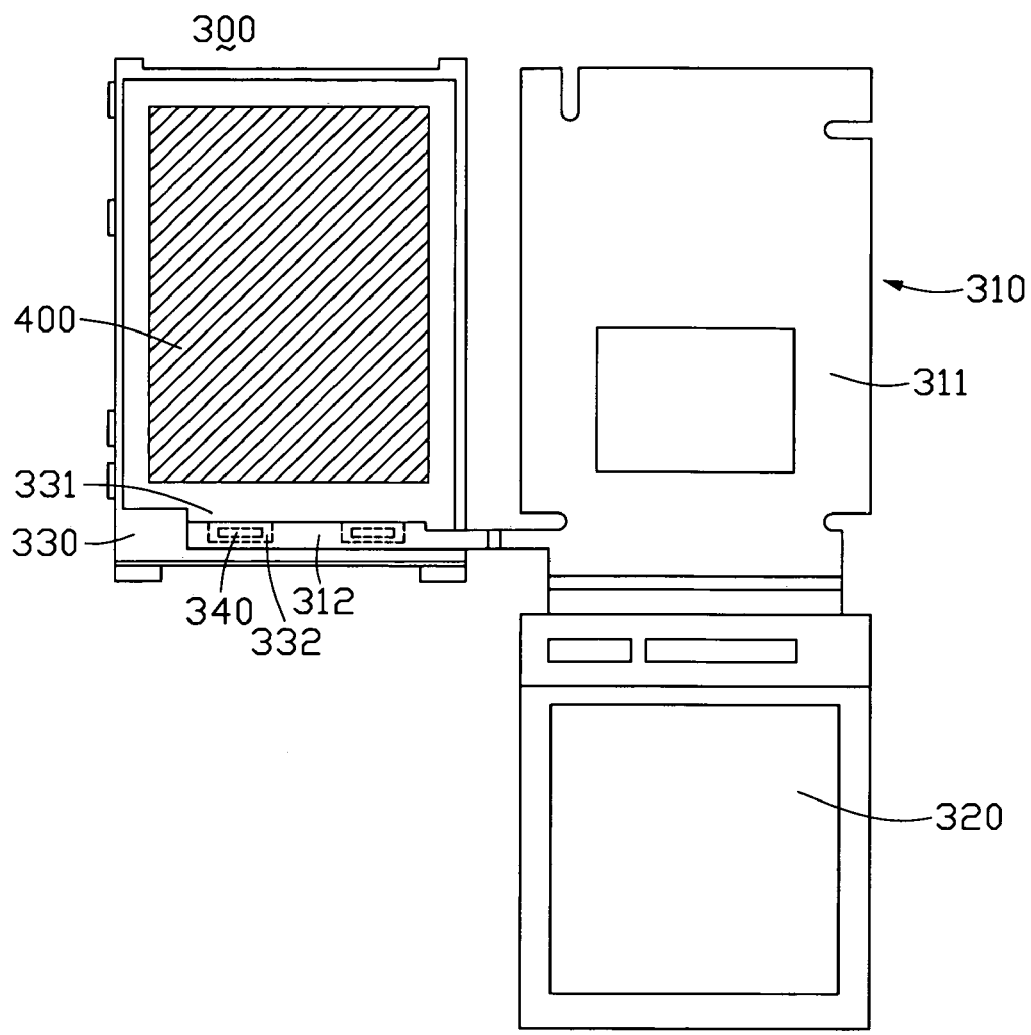
FIG. 6 is a schematic, top plan view of a conventional LCD device prior to assembly thereof, the LCD device comprising a light guide plate and LEDs, the light guide plate having an incident surface.
Figure 7:
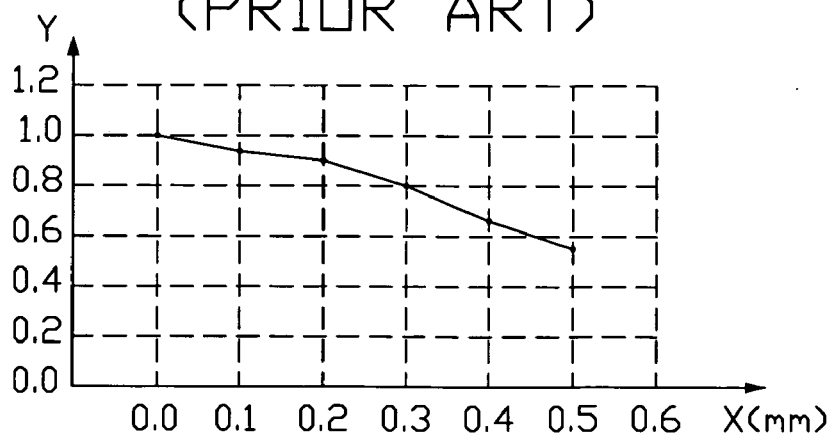
FIG. 7 is a graph showing relative emitting luminance ("Y") of the light guide plate of FIG. 6 varying as a function of a distance ("X") between the LEDs and the incident surface of the light guide plate.

Referring to FIG. 5, the second diffusion plate 54, the second brightness enhancement film 53, the first brightness enhancement film 52, and the first diffusion plate 51 are sequentially placed on the emitting surface 562 of the light guide plate 56. The liquid crystal display panel 1 and the light cover plate 2 are placed on the first diffusion plate 51, to thereby define a light emitting area of the backlight module 5.

The spring arms 556 press the radiation elements 59 against the incident surface 561 of the light guide plate 56. Thereby, any distance between each radiation element 59 and the incident surface 561 is decreased or eliminated, and correspondingly any obliquity between each radiation element 59 and the incident surface 561 is also decreased or eliminated. The result is improved brightness and uniformity of the emitting luminance of the LCD device 100.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
   a frame having a side wall and one or more spring arms, the one or more spring arms extending from an inside of the side wall;
   a light guide plate disposed in the frame and including an incident surface;
   one or more radiation elements being pressed by corresponding one or more of the one or more spring arms against the incident surface of the light guide plate; and
   a printed circuit board, the radiation elements being arranged on the printed circuit board;
   wherein a plurality of protrusions extends from the inside of the side wall of the frame, and the protrusions and the one or more spring arms define an interspace therebetween for receiving at least a part of the printed circuit board therein.

2. A liquid crystal display device, comprising:
   a backlight module and a liquid crystal display panel;
   wherein the backlight module includes:
   a frame having a side wall and spring arms, the spring arms extending from the sidewall toward an inside of the frame;
   a light guide plate disposed in the frame and having an incident surface;
   one or more radiation elements being abutted by corresponding spring arms and thereby pressed against the incident surface; and
   a printed circuit board, the radiation elements being arranged on the printed circuit board;
   at least one protrusion extending from the side wall toward the inside of the frame; wherein the spring arms and the at least one protrusion cooperatively define an interspace therebetween, and one side edge of the printed circuit board is fixed in the interspace.

* * * * *